Figure 1:
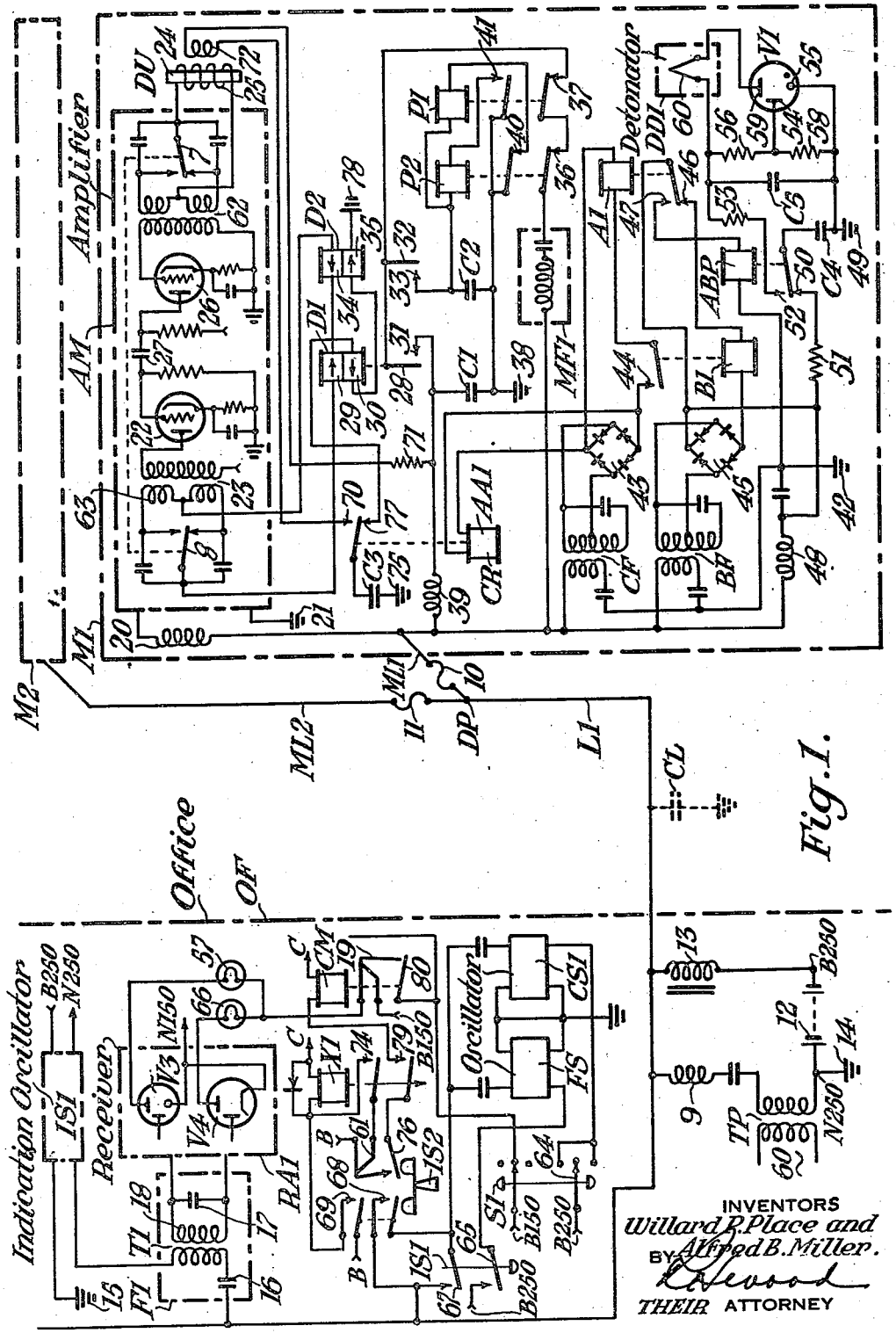

Patented Oct. 22, 1946

2,409,720

UNITED STATES PATENT OFFICE 2,409,720

SELECTIVE CONTROL AND INDICATION SYSTEM

Willard P. Place, Penn Township, Allegheny County, and Alfred B. Miller, Edgewood, Pa., assignors to The Union Switch & Signal Company, Swissvale, Pa., a corporation of Pennsylvania Application November 4, 1943, Serial No. 508,948

13 Claims. (Cl. 177—353)

Our invention relates to selective control and indication systems, and more particularly to apparatus for such systems using different combinations of currents of different characteristics.

An electric equipment or device is frequently controlled and indicated through a single line circuit by using an alternating current of one frequency for control and a different alternating current of a different frequency for indication. In this way a plurality of devices can be controlled and indicated selectively through a single line circuit. The selectivity is more accurate and also more reliable by using different combinations of alternating currents of different frequencies. In such systems simplicity of apparatus, freedom from operation by shock excitation and foreign current, and the resetting and testing of the apparatus are essential features.

Accordingly, a feature of our invention is the provision in selective control and indication systems of novel and improved apparatus for indicating different conditions of an electric equipment and for controlling the operation of such equipment.

Another feature of our invention is the provision of apparatus of the type here involved incorporating novel means for automatically indicating an abnormal condition at a device and for subsequently resetting the apparatus.

Again, a feature of our invention is the provision of apparatus of the type here contemplated incorporating novel means to control the operation of a device and wherewith the probability of operation due to shock excitation and foreign energy is minimized.

A specific feature of our invention is the provision in a selective control and indication system for submarine mines of improved apparatus to indicate at a shore office the entrance of a vessel into the mine field and to fire the mine approached.

A further specific feature of our invention is the provision of improved indication and firing apparatus for submarine mines wherewith all sources of power are located at a shore office.

Other features, advantages and objects embodying our invention will appear as the specification progresses.

To accomplish the foregoing features, objects and advantages of our invention we provide a control office with a plurality of different current sources which are connected in different combinations to a two-conductor line circuit extending from the office to each of a plurality of devices that are to be indicated and controlled, each such device being provided with an electric equipment that responds to a preselected arrangement of the currents thus supplied to the line circuit. Preferably an office battery and a commercial source of alternating current, such as a 60 cycle current, are connected to the line circuit to power certain portions of the equipment of each of the devices. Indication oscillators and control oscillators, together with an operating oscillator at the office supply indication currents, control currents and an operating current, respectively. Each device has assigned thereto an indication oscillator and a control oscillator which supply currents of different frequencies preselected to be individual for the respective device. The operating oscillator supplies current at a frequency different from that of the other oscillators, but the operating oscillator is common to the group of devices.

Each indication oscillator is normally active and is connected across the line circuit through a filter tuned to create a resonant condition with respect to the oscillator and the distributed capacitance of the line circuit, so that each indication oscillator normally supplies a line charging current which is of a relatively large preselected value and which current can be used as an indication current. Indication receivers are provided at the office, one for each device, and each such receiver is coupled to the office filter interposed in the connection of the indication oscillator for the same device and the receiver is excited in one sense to actuate a first indicator when the indication current is decreased and is excited in another sense to actuate a second indicator when such indication current is increased.

The control and operating oscillators are connected to the line circuit through switching means capable of connecting the control oscillator of any one of the devices and the operating oscillator to the line circuit to supply control current and operating current to that device simultaneously. Such switching means may be controlled either manually or automatically.

Each device is provided with an electric equipment which includes indication apparatus, control and operating apparatus and testing and reset means.

The indication apparatus of each equipment includes an amplifier normally powered by the direct current and commercial alternating current supplied to the line circuit at the office, a detector unit, two indication relays preferably of the bias polar type and a selector or shunt circuit. The indication relays are connected to the output side of the amplifier and the detector unit is connected to the input side of the amplifier to operate the relays one after the other in response to a predetermined condition or event at the particular device. Either one of these indication relays when operated alone connects the shunt or selector circuit which includes a filter across the line circuit. Such filter is tuned to resonance at the frequency of the indication oscillator of the same device. Thus when a selector circuit is connected to the line circuit, the circuit is detuned as far as the respective indication oscillator is concerned and its indication or line charging current is materially reduced and such reduction of the current supplied by the one oscillator is effected with substantially no change in the current supplied by any one of the other indication oscillators. The indication relays govern the selector circuit to connect it from the line circuit when both indication relays are operated, so that with both relays operated the indication current supplied by the respective indication oscillator is increased to its normal value to effect through the office receiver a second indication. A condenser is at times connected to the line circuit to be charged by the office source of direct current and then at other times it is connected to the indication relays to reset these relays to their normal positions due to the discharge of the condenser.

The control and operating apparatus of the equipment of a device includes two control relays, one connected to the line circuit through a filter tuned to pass current only of the frequency of the control oscillator of that device. The other control relay is connected to the line circuit through a filter tuned to pass current only of the frequency of the operating oscillator. These two control relays govern each other and a pumping action results when control and operating currents are supplied to the line circuit simultaneously. The equipment of each device also includes a condenser of relatively small capacity and a condenser of relatively large capacity. The pumping action of the control relays connects the small condenser to the line circuit for it to be charged by the direct current source and then connects this condenser to the large condenser to discharge the small condenser into the large condenser. After several such operations the large condenser is charged to a point where it excites an associated gas filled tube to the breakdown point and the large condenser discharges through the tube in series with an operating unit of the device causing operation of the electric equipment. The control relay alone is used to test the indication apparatus.

We shall describe several forms of apparatus embodying our invention, and shall then point out the novel features thereof in claims.

Figure 2:
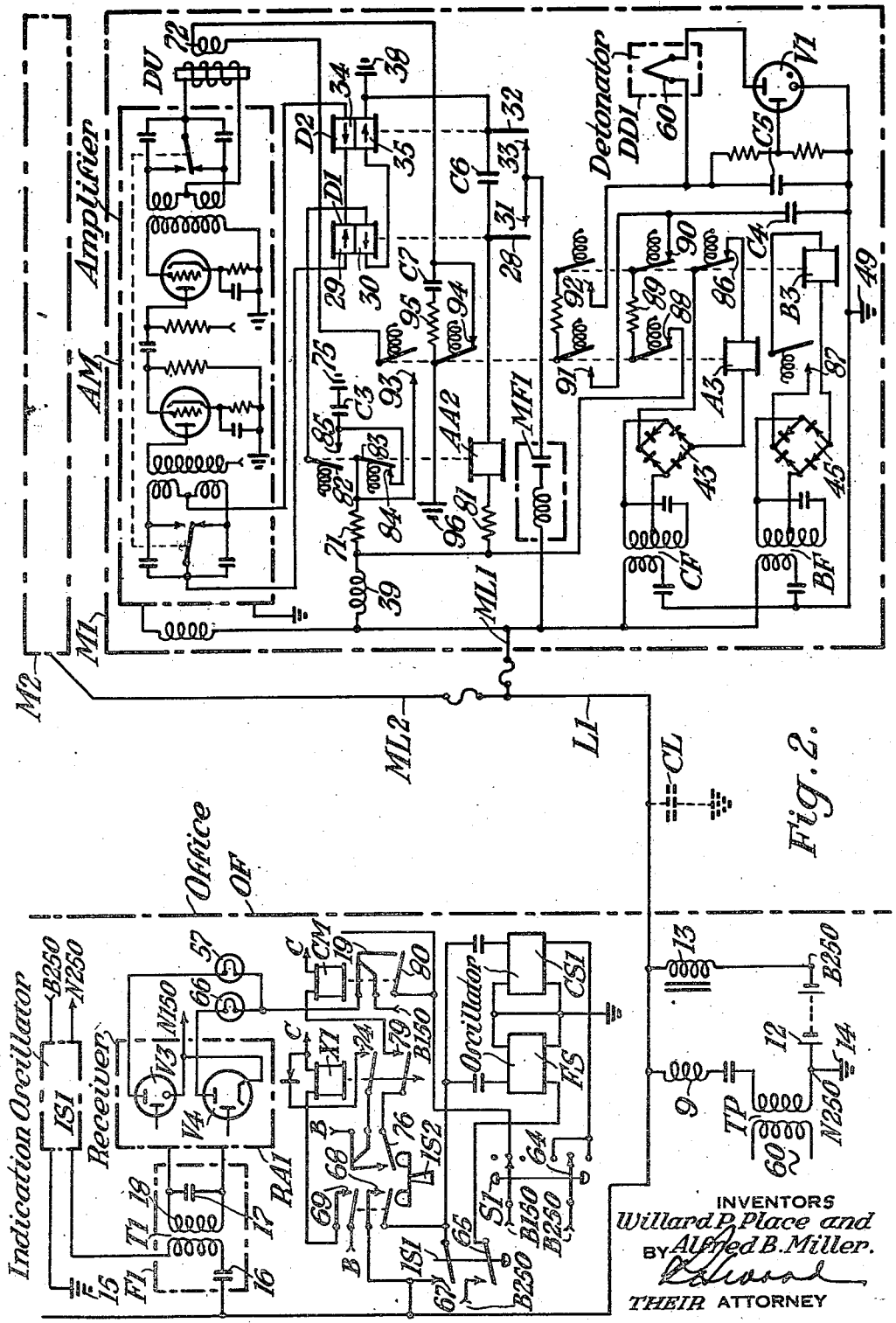
Figure 3:
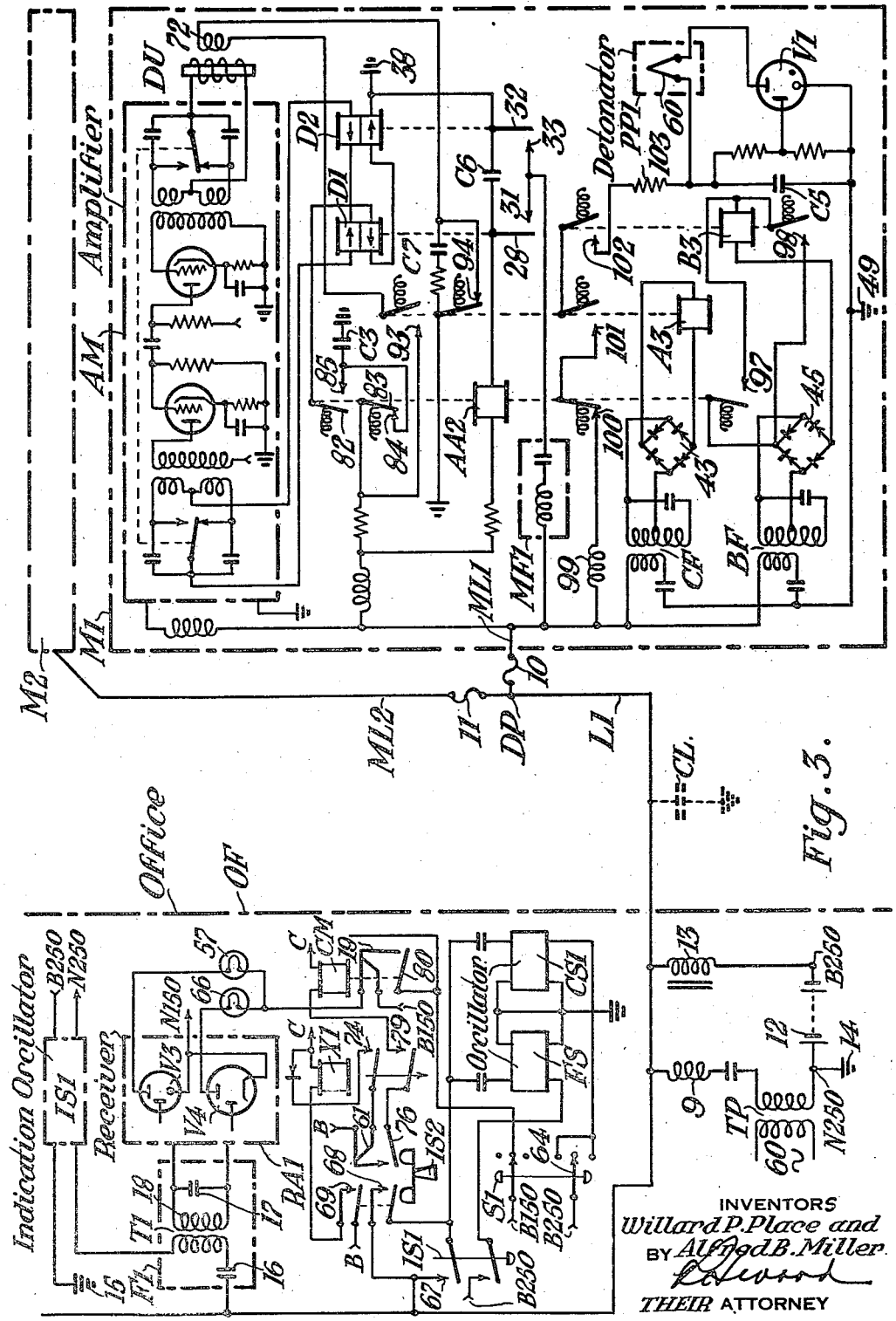
Figure 4:
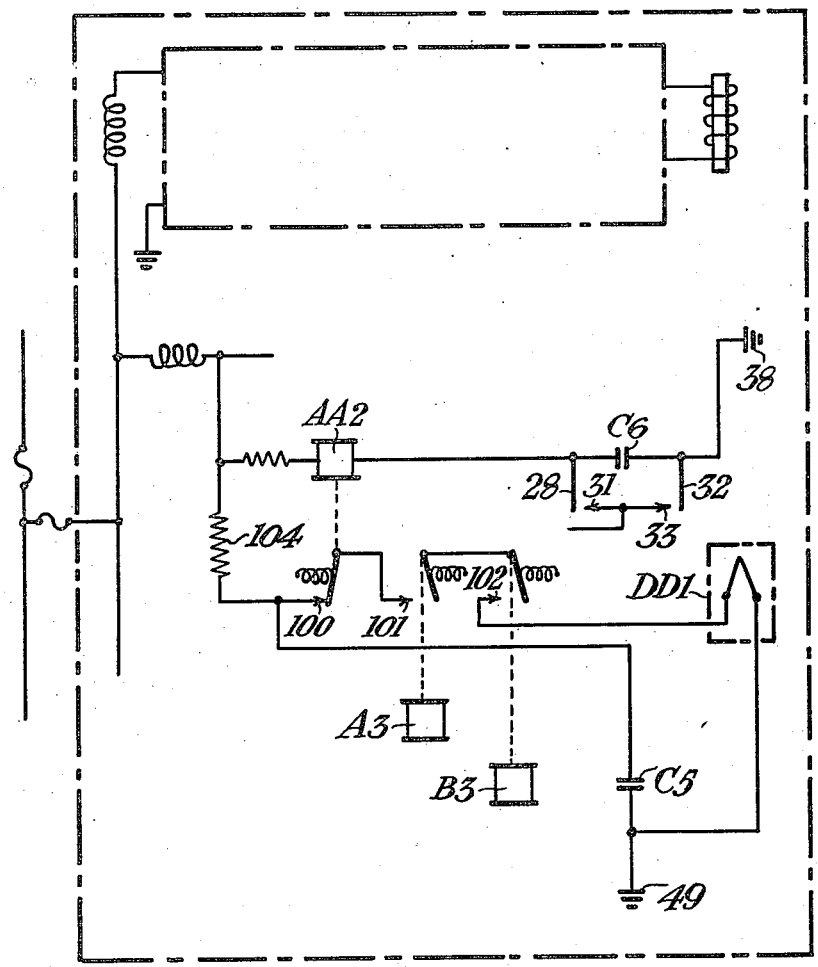

In the accompanying drawings, Figs. 1, 2 and 3 are diagrammatic views showing three different forms, respectively, of apparatus each of which embodies our invention when used for control and indication of a submarine mine field. Fig. 4 is a diagrammatic view showing a modification of the apparatus of Fig. 3 that we may use, and which also embodies the invention.

In each of the different views, like reference characters are used to designate similar parts.

It is to be understood that our invention is not limited to submarine mine fields, and this one application serves to illustrate the many cases where such apparatus is useful.

Referring to Fig. 1, the reference character OF designates an office from which a submarine mine field is controlled. Such mine field will include a number of mines or a plurality of similar groups of mines, there being a sufficient number of mines to protect a given area. In Fig. 1 only two mines MI and M2 of a mine field are shown, since the mines are alike and two are sufficient to fully illustrate our invention. Office OF may be on shore or any other place in the vicinity of the area that is protected, and the office and mines are connected by a transmitting or line circuit which preferably comprises a metallic conductor as one side of the circuit and the ground path as the other side of the circuit, although a second metallic conductor can be used. In Fig. 1, a cable LI extends from the office to a distribution point DP conveniently located with respect to the mine field and single conductor cables ML1 and ML2 extend from the distribution point DP to mines MI and M2, respectively. Thus a two-conductor line circuit extends from the office to the mines in multiple, one side of such circuit including the conductor LI and the other side being completed through the ground path as will appear from time to time during the specification. It is to be noted that line conductor LI possesses distributed capacitance with respect to ground and to visualize such capacitance a dotted line condenser CL has been added to the drawings but it is to be understood this condenser forms no physical piece of apparatus. Fuses 10 and 11 are interposed in cables ML1 and ML2, respectively, for reasons to appear hereinafter.

The apparatus at office OF comprises different sources of current and indication apparatus, together with control, testing and cancelling means. The current sources include a battery, a source of commercial frequency alternating current and a plurality of oscillators. Battery 12 is preferably of a relatively high voltage, such as 250 volts, suitable for energizing electron tubes, and it is connected across the line circuit by its positive terminal B250 being connected to cable LI through an inductance 13 and its negative terminal N250 being connected to a ground electrode 14. The commercial source of alternating current includes a transformer TP, a secondary winding of which is connected to ground electrode 14 and to line conductor LI through a filter 9 turned to pass current of 60 cycles per second. The office oscillators may be of any one of several types, and preferably they are of the electron tube type powered from battery 12 or some other convenient source, and these oscillators are shown conventionally for the sake of simplicity. A control oscillator and an indication oscillator are provided at the office for each of the mines, together with a firing oscillator which is common to the mine field. Indication oscillator IS1 and control oscillator CS1 for mine M1, and a firing or operating oscillator FS only are shown in Fig. 1 in order to not unduly complicate the drawings because these oscillators are sufficient for an understanding of our invention. These oscillators supply current at different frequencies and to aid in understanding the invention we shall refer to the frequencies of oscillators IS1, CS1 and FS as being $f1$, $f20$ and $f30$, respectively.

Indication oscillator IS1 is normally active due to its input side being connected to terminals B250 and N250 of battery 12, and the output side of this oscillator is connected to conductor LI and ground electrode 15 of the line circuit through a filter F1 comprising a transformer T1 and condensers 16 and 17. Filter F1 is proportioned to tune the circuit comprising oscillator IS1 and line conductor L1 with its distributed capacitance CL to resonance at frequency $f1$ so that oscillator IS1 normally supplies a line charging current which serves as an indication current. The indication oscillator for each of the other mines is connected to the line circuit in a manner similar to that of indication oscillator IS1 except for the tuning of the associated filter, and it is clear that each indication oscillator supplies a line charging or indication current and the several oscillators do not interfere with each other.

Control oscillator CS1 and firing oscillator FS are normally inactive and are excited and connected to the line circuit through switches to appear when the operation of the apparatus is described.

The office indication apparatus includes a receiver and two indication lamps for each mine, a receiver RA1 and lamps 57 and 66 being provided for mine M1. The receiver RA1 may take different forms, and preferably it would be substantially of the structure disclosed and claimed in a copending application for Letters Patent of the United States, Serial No. 494,183, filed July 10, 1943, by Willard P. Place, for Electrical control and indication apparatus, Patent No. 2,400,-259, dated May 14, 1946, and to which application reference is made for a full understanding of the structure of such indication apparatus. It is sufficient for the present application to point out that the input terminals of receiver RA1 are connected across secondary winding 18 of transformer T1 of the filter F1, through which current is supplied by indication oscillator IS1 to the line circuit, and lamps 57 and 66 are interposed in the anode circuits of gas filled electron tubes V3 and V4, respectively, of the receiver RA1, lamps 57 and 66 and tubes V3 and V4 corresponding to similar elements of the aforementioned Place application. The anode circuits of tubes V3 and V4 are supplied with current from a source not shown, but the terminals of which are indicated at B150 and N150, and in which circuits a back contact 19 of a relay CM to be referred to later is interposed. When the normal value of indication current flows through filter F1, both tubes V3 and V4 are non-conducting and lamps 57 and 66 are dark. When the line circuit is conditioned for the indication current flowing through filter F1 to be decreased, such decrease acts to excite receiver RA1 as required to break down tube V4 and illuminate lamp 66. Once made conductive, the tube V4 remains conductive and lamp 66 illuminated until such time as relay CM is energized to open the anode circuit at contact 19. When the indication current flowing through filter F1 is increased and restored to its normal value, such increase in the indication current acts to excite the receiver RA1 as required to ionize tube V3 and anode current flows to illuminate lamp 57. Once broken down, the tube V3 remains conductive to illuminate lamp 57 until such time as relay CM is energized to open the anode circuit at back contact 19.

Each mine is provided with an electric equipment through which the approach of a vessel is detected and indicated and the mine is fired. The mine equipments are all alike except for the tuning thereof and a description of the equipment of one mine is sufficient for an understanding of all.

In Fig. 1, the equipment for mine M1 is disclosed, but mine M2 is shown conventionally since its equipment would be a duplication of that for mine M1 except for the tuning of certain elements.

The electric equipment for mine M1 comprises as essential elements an indicating apparatus and a control and firing apparatus, together with reset and testing means.

The indicating apparatus for the equipment of mine M1 includes an amplifier AM, a detecting or control unit DU, indication relays D1 and D2, two other relays P1 and P2, and a shunt or selector circuit.

Amplifier AM is preferably of the electron tube type, and it may be of any one of several arrangements and in Fig. 1 only those portions of amplifier required for an understanding of our invention are disclosed.

Amplifier AM is connected to the line circuit through an inductance 20 and ground electrode 21 for the filaments of the tubes to be heated by 60 cycle alternating current supplied through office transformer TP, and for the plate circuits of the tubes to be excited by direct current from battery 12. Amplifier AM preferably includes a coder or chopper only the code contact members 7 and 8 of which are shown. Such coder may be, for example, similar to that covered in Letters Patent of the United States No. 2,300,790, granted November 3, 1942, to Robert M. Laurenson for Electrical relays. The operating winding of such coder or chopper would be supplied with either 60 cycle alternating current or direct current through the line circuit and contact members 7 and 8 operated at a preselected code rate, the two contact members being operatively connected as indicated by a dotted line in the drawings and operated in step with each other.

Control or detecting unit DU associated with amplifier AM is preferably of the magnetic type responsive to magnetic fields. The specific construction of such unit forms no part of our invention, and it is shown conventionally for the sake of simplicity. A core 24 of highly magnetizable material such as "Permalloy," has mounted thereon a coil 25, which is coupled to the grid circuit of a first stage tube 26 of the amplifier through coder contact member 7 and a transformer 62. The plate circuit of tube 26 is coupled to the grid circuit of the final stage tube 22 of the amplifier through a condenser 27, either directly as shown in the drawings or through one or more intermediate stages of amplification. The plate circuit of the final stage tube 22 is used to govern indication relays D1 and D2, to be described shortly, the plate circuit being connected to the relays through a transformer 23 and contact member 8 of the coder.

Relays D1 and D2 are alike and are preferably two winding magnetically biased polar stick relays such as, for example, the so-called "Weston sensitrol" type, or such relays may be similar to that covered in Letters Patent of the United States No. 2,140,604, granted December 20, 1938, to Clarence S. Snavely for Electrical relays, when the relay of the patent is modified to be biased in the manner about to be described. Looking at relay D1, its armature 28 normally occupies a mid position, that is, the position shown in Fig. 1. Winding 29 of relay D1 is an operating winding and when current flows therethrough in the direction indicated by an arrow placed thereon, the armature 28 is moved to a right-hand position to engage a contact 31. Due to the magnetic bias provided by unequal air gaps with respect to the armature 28 and the permanent magnet and other parts of the relay, armature 28 is held at this right-hand position with a relatively strong pull, so that if winding 29 is energized by current flowing in the direction opposite to that indicated by the arrow, the energization is ineffective to move armature 28 away from the right-hand position unless the value of current is many times that required to operate the armature from the mid position to the right-hand position. Winding 30 of relay D1 is a reset winding and the number of turns of this winding and the proportioning of the parts are such that when current of a given value flows therethrough in the direction indicated by an arrow placed on winding 30, the armature 28 is moved against the relatively strong pull of the magnetic bias back to the mid position. Thus, a relatively weak energization of the relay by current flowing through winding 29 in the direction of the arrow placed on that winding is sufficient to operate armature 28 from the mid to the right-hand position but a relatively strong energization of the relay by current of a given value flowing in winding 30 in the direction of the arrow placed on that winding is required to reset the armature 28 back to its mid position. Armature 28 remains in the position to which it was last moved when the relay is deenergized. Relay D2 is of like construction, except it is arranged for its armature 32 to be moved from the mid position to a left-hand position as viewed in Fig. 1 to engage a contact 33 when operating winding 34 of this relay is energized by current flowing in the direction of the arrow placed on winding 34, and armature 32 is reset to the mid position when reset winding 35 is energized by current flowing in the direction of the arrow placed on that winding. Windings 29 and 34 are connected in series to the two portions of secondary winding 63 of transformer 23 through contact member 8 of the coder, contact member 8 serving to rectify the electromotive force induced in secondary winding 63 in the well-known manner.

Normally, that is, when no vessel is approaching mine M1, a steady state condition exists for amplifier AM and relays D1 and D2 are deenergized. When a vessel with a steel hull and other magnetic and electric parts approaches, a magnetic field is created and magnetic flux threads core 24 of unit DU, such flux being variable due to the motion of the vessel and other conditions. This induces an electromotive force in coil 25, and such electromotive force is periodically interrupted or chopped by operation of coder contact member 7 and a corresponding coded electromotive force is created in the secondary winding of transformer 62 to be applied to tube 26, causing a corresponding variation of current to appear in the plate current of the final stage tube 22, with the result a corresponding electromotive force is created in secondary winding 63 of transformer 23. This latter electromotive force is rectified by action of contact member 8 because contact member 8 is operated in step with contact member 7, and rectified current flows in the windings 29 and 34 of relays D1 and D2, the connection being such that this current flows in the direction of the arrow placed on winding 29 and armature 28 of relay D1 is operated to the right-hand position, but armature 32 of relay D2 is retained at its mid position. When the vessel passes over the mine, the magnetic field about unit DU is oppositely varied so that the rectified current flowing in windings 29 and 34 is of the opposite direction, that is, it now flows in the direction indicated by the arrow placed on winding 34 of relay D2. Armature 34 of relay D2 is now operated to its left-hand position, but armature 28 of relay D1 remains at the right-hand position because the energization effected through winding 29 is ineffective to overcome the relatively strong pull of the magnetic bias of the relay.

Relays P1 and P2 are direct current neutral relays that are governed by the indication relays D1 and D2 and by each other in a manner to appear shortly.

The shunt or selector circuit includes a filter MF1 comprising inductance and capacitance tuned to resonance at the frequency of $f_1$, that is, at the frequency of the indication oscillator IS1 for mine M1. This selector circuit extends from cable ML1 of the line circuit through filter MF1, back contacts 36 and 37 of relays P2 and P1, respectively, and either through contact 32—33 of relay D2 and condenser C2 to ground electrode 38, or through contact 28—31 of relay D1 and condenser C1 to ground electrode 38. Condensers C1 and C2 are relatively large and do not appreciably affect the tuning of the selector circuit. It follows, that with either relay D1 or D2 operated the shunt or selector circuit is connected to the line circuit.

When both relays D1 and D2 are operated, the relays P1 and P2 are supplied with direct current from the line circuit through inductance 39, contact 28—31 of relay D1, contact 32—33 of relay D2, winding of relay P1, back contact 40 of relay P2, and ground electrode 38, and relay P1 is energized. Relay P1 when energized to close front contact 41 completes the connection for relay P2 to the line circuit and relay P2 is energized and picked up to open back contact 40 to deenergize relay P1, which latter relay is released to open front contact 41 and deenergize relay P2. Thus relays P1 and P2 are energized with a pumping action whenever relays D1 and D2 both occupy their operated positions. Such pumping action of relays P1 and P2 serves to intermittently open the selector circuit at back contacts 36 and 37.

Relays D1 and D2 are reset through the means of a condenser C3 and a relay AA1. With relay AA1 energized in a manner to appear hereinafter to close front contact 70, a circuit path is formed for direct current to flow from cable ML1 of the line circuit through inductance 39, resistance 71, a coil 72, the function of which will appear hereinafter, front contact 70 of relay AA1, condenser C3 and ground electrode 75, and condenser C3 is charged by the direct current of the line circuit. When relay AA1 is subsequently deenergized, the condenser C3 is disconnected from the line circuit and is connected to the reset windings 30 and 35 of relays D1 and D2, respectively, through back contact 77 and ground electrodes 78 and 75, and the discharge of condenser C3 flows through windings 30 and 35 in the direction indicated by the arrows and is of a sufficient value to cause the relays to be reset.

The control and operating apparatus of the equipment for mine M1 includes control relays A1, B1 and ABP, a gas filled tube 1, condensers C4 and C5 and a detonator DD1. Relays A1, B1 and ABP are neutral relays and relay A1 is connected to cable ML1 and ground electrode 42 of the line circuit through a filter CF, a rectifier 43 and front contact 44 of relay B1; and relay B1 is connected to the line circuit through a filter BF, a rectifier 45 and back contact 46 of relay A1. Filter CF is tuned to pass current only of the frequency $f20$, that is, current only of the frequency supplied by the control oscillator CS1 for mine M1. Filter BF is tuned to pass current only of the frequency $f30$, that is, current supplied by the firing oscillator FS. Thus, when currents from both oscillators CS1 and FS are supplied to the line circuit, relays A1 and B1 are energized and deenergized with a pumping action because each relay controls the other. Relay ABP has one terminal of its winding connected to ground electrode 42 and the other terminal of its winding connected to cable ML1 through front contact 47 of relay A1 and an inductance 48, and relay ABP is operated in step with the operation of relay A1 due to being energized by the direct current from the line circuit.

Condenser C4 is normally charged by direct current supplied from the line circuit due to one terminal of the condenser being connected to ground electrode 49 and its other terminal being connected to cable ML1 through back contact 50 of relay ABP, resistance 51 and inductance 48. When relay ABP is picked up to open back contact 50 and close front contact 52, the condenser C4 is disconnected from the line circuit and is connected to condenser C5 through resistance 53, and condenser C4 discharges into condenser C5. Condenser C4 is of relatively small capacity and condenser C5 is of relatively large capacity, and consequently several operations of relay ABP are required to alternately charge condenser C4 from the line and then discharge the condenser into condenser C5 before condenser C5 is fully charged.

Condenser C5 is connected across control element 54 and cathode 55 of tube V1 through a voltage divider consisting of resistors 56 and 58, and is connected to anode 59 through an element 60 of the detonator DD1. The parts are proportioned so that when condenser C5 is substantially fully charged, tube V1 is excited to its breakdown point and condenser C5 discharges through the element 60 and the anode-cathode path of the tube and such discharge current is of a value to heat element 60 to cause the detonator to fire the mine.

Relay AA1 is connected across the output terminal of rectifier 43 and thus is energized when control current from oscillator CS1 is supplied to the line circuit.

Normally the line circuit is energized by direct current from battery 12 and by 60 cycle alternating current from transformer TP, and is also excited by each of the indication oscillators, each indication oscillator supplying a normal value of line charging or indication current. At mine M1 the amplifier AM is powered by the direct current and by the 60 cycle alternating current and is in an active condition. Likewise, the amplifier at each of the other mines is in an active condition.

Assuming a vessel enters the mine field to approach mine M1, the magnetic field created by the vessel influences unit DU and current flows in the operating windings of relays D1 and D2 in a direction that operates relay D1 and connects the shunt circuit including filter MF1 across the line circuit. The connecting of filter MF1 across the line circuit detunes the line circuit for oscillator IS1 and the indication current supplied by oscillator IS1 is reduced from its normal value; such reduction of the indication current energizing receiver RA1 in the manner required to illuminate indicator lamp 66. The illumination of lamp 66 serves as a warning indication to the office operator of the presence of a vessel and for him to be on the alert. As the vessel approaches the mine and passes over the mine, the magnetic field created by the vessel is of the opposite nature and influences the unit DU at amplifier AM to cause current to flow in the operating windings of relays D1 and D2 in the opposite direction from that first described, and relay D2 is operated, the first relay D1 being retained at its operated position due to the strong magnetic bias of the relay. With both relays D1 and D2 at their operated positions the associated relays P1 and P2 are energized with a pumping action causing the shunt circuit to be first disconnected from the line circuit and then thereafter intermittently connected and disconnected from the line circuit. The first time the shunt circuit is disconnected the indication current from oscillator IS1 is increased to its normal value and the receiver RA1 is energized as required to illuminate the second indicator lamp 57, the display of lamp 57 serving as an indication to the operator of the presence of the vessel within the destructing area of mine M1.

It is to be observed that if the operator takes action to cancel the illumination of lamps 57 and 66 as he can in a manner to be explained shortly, the pumping action of relays P1 and P2 will immediately restore the illumination of the lamps as long as the indication relays D1 and D2 remain at their operated positions.

For the operator to fire mine M1 in response to the indication displayed by lamps 57 and 66, an arming switch S1 would be moved either up or down to close contact 64 and complete a circuit for energizing control oscillator CS1 from battery 12. Immediately after the operation of switch S1, a second or firing switch IS1 would be closed. The closing of contact 65 of switch IS1 completes a circuit for energizing firing oscillator FS from battery 12, and the closing of contact 67 of switch IS1 completes a circuit path for connecting the output sides of oscillators CS1 and FS to the line circuit. With both control current and firing current supplied to the line circuit, both control relays A1 and B1 are energized and are operated by a pumping action because these relays control each other. Relay ABP is operated in step with relay A1 and condenser C5 is gradually charged due to the operation of charging condenser C4 from the line and then discharging condenser C4 into condenser C5. When the charge on condenser C5 builds up to a predetermined point, the tube V1 breaks down and condenser C5 discharges through the detonator to fire the mine.

The firing of mine M1 would tear the mine end of cable ML1 loose and this cable would become grounded causing an excessive flow of current and fuse 10 would blow to free the system of the cable to the fired mine.

It is to be noted that the operator can fire mine M1 by operation of switches S1 and IS1 at any time, such action being independent of the indication apparatus. It is clear, however, that the action of firing the mine can be made automatic or can be made dependent upon the indication means of relays controlled in multiple with the lamps 57 and 66.

We shall next assume that a vessel approaches mine M1 to bring about the display of lamps 57 and 66 as described hereinbefore, and the operator desires not to fire the mine and wishes to reset relays D1 and D2 and cancel the display of lamps 57 and 66. Under this condition the switch S1 would be moved to energize control oscillator CS1 and a reset switch IS2 would be operated to the left as viewed in Fig. 1 to close contacts 68 and 69. The closing of contact 68 connects the output side of oscillator CS1 to the line circuit to energize relay AA1 at the mine and bring about the charging of condenser C3. The closing of contact 69 completes an obvious circuit for an office relay X1, and relay X1 is picked up to close a stick circuit which includes its own front contact 74 and a normally closed contact 61 of switch IS2. The operator would next move the switch IS2 from the left-hand position to the right-hand position opening contacts 68, 69 and 61 and closing a contact 76. The opening of contact 68 interrupts the supply of control current from oscillator CS1 and relay AA1 at the mine is deenergized to connect condenser C3 to the reset windings of relays D1 and D2 and these relays are reset to their normal condition by the discharge of condenser C3. The opening of contacts 69 and 61 deenergizes relay X1, but relay X1 is slow release in character and during the slow release period of relay X1 a circuit is formed from terminal B of a source not shown through contact 76 of switch IS2, front contact 79 of relay X1, and winding of relay CM to terminal C, and relay CM is energized and picked up to open back contact 19 and close front contact 80. The opening of back contact 19 of relay CM opens the anode circuits for tubes V3 and V4 and they are deionized so that the lamps 57 and 66 are extinguished. The closing of contact 80 of relay CM is ordinarily ineffective to maintain the anode circuit for the electron tube closed through the normal position of switch S1 because switch S1 is now set at either the raised or lowered position. The contact 80 and the connection through switch S1 are useful in connection with the control of other mines of other groups.

We shall next assume that the apparatus is in its normal condition and the operator desires to test the equipment at mine M1. Switch S1 is set to energize control oscillator CS1 and switch IS2 is moved to the left to connect the output side of oscillator CS1 to the line circuit and to also energize the office relay X1. Relay AA1 at mine M1 is energized by the control current and condenser C3 is charged as previously explained. The initial surge of charging current flowing through coil 72 associated with the unit DU influences the unit DU in a manner to bring about operation of relay D1 to connect the shunt circuit to the line circuit so as to reduce the indication current from oscillator IS1 and cause lamp 66 to be illuminated. The parts are proportioned so that the dying down of the current as condenser C3 reaches a fully charged condition influences unit DU in a manner to bring about operation of the second relay D2 and the indicator lamp 57 is illuminated due to the action of relays P1 and P2 to interrupt the shunt circuit to restore the indication current to its normal value. Illumination of lamps 57 and 66 would serve to indicate that the line circuit to mine M1 is complete, amplifier AM is active, unit DU is effective and relays D1 and D2 are in an operative condition. Movement of switch IS2 to the right results in the resetting of relays D1 and D2 and the cancelling of the display of lamps 57 and 66 in the manner explained previously.

In Fig. 2 the office apparatus and the equipment for mine M1 comprises as essential elements, indication apparatus and control and firing apparatus, together with reset and testing apparatus, the same as in Fig. 1. Several elements of the mine equipment of Fig. 2 are different, however, from the corresponding elements of Fig. 1. It is believed that an understanding of the mine equipment of Fig. 2 can best be had from a description of the operation of the apparatus taken in connection with a description of the apparatus of Fig. 1.

Normally, that is, when no vessel is approaching the mine field of Fig. 2, the line circuit is energized by battery 12 and transformer TP at the office, and amplifier AM at the mine is powered and made active. Also, the line circuit is excited by the indication oscillators for the several mines, each such oscillator supplying a line charging or indication current of a given normal value. When a vessel approaches mine M1 of Fig. 2, for example, the electromotive force created at unit DU is applied to amplifier AM and relay D1 is energized at a polarity as required to operate the relay to close its contact 28—31. The closing of contact 28—31 of relay D1 connects the selector circuit including filter MF1 across the line circuit, such selector circuit extending from cable ML1 through filter MF1, contact 28—31 of relay D1, a condenser C6 and ground electrode 38. Condenser C6 is of large capacity and does not materially affect the tuning of this selector circuit, and consequently the indication current supplied by oscillator IS1 is reduced. This sudden reduction in the indication current energizes receiver RA1 as required to illuminate lamp 66. As the vessel moves closer to pass the mine, the electromotive force created through unit DU results in the current supplied to the operating windings of relays D1 and D2 flowing in the opposite direction from that first supplied, and the armature of relay D2 is operated to close contact 32—33, relay D1 remaining in its left-hand position due to the strong magnetic bias of the relay. With both relays D1 and D2 operated, direct current flows from cable ML1 through inductance 39, resistance 81, winding of a relay AA2, contact 29—31 of relay D1, contact 32—33 of relay D2 and to ground electrode 38. Relay AA2 is a bias polar relay and the connections are such that the current thus supplied to the relay causes the relay to be energized at a polarity to operate its contact members 82 and 83 against a spring bias force to open contact 83—84 and close contact 82—85. It is to be noted that contact 83—84 controls a circuit by which a condenser C3 is normally charged by direct current supplied from the line circuit through inductance 39, resistance 71, contact 83—84 and ground electrode 75. Operation of relay AA2 to open contact 83—84 and close contact 82—85 transfers condenser C3 to the reset windings 30 and 35 of relays D1 and D2 and the discharge current from condenser C3 resets these relays. With relays D1 and D2 reset the selector circuit is opened so that the indication current from oscillator IS1 is restored to its normal value and receiver RA1 is energized as required to illuminate lamp 57.

To fire mine M1 of Fig. 2, the operator moves switches S1 and IS1 to supply both control and firing current to the line circuit. The control current is passed by filter CF to a control relay A3 of the bias polar type, the connection including a normally closed contact 86 of a second control relay B3, which is also of the bias polar type. With relay A3 operated to close contact 87, the connection of relay B3 to the rectifier 45 is completed and relay B3 is energized by the firing current passed by filter BF. Such operation of relay B3 opens contact 86 and relay A3 is deenergized and operated back to its normal condition to open contact 87 and cause relay B3 to be deenergized and operated to its normal condition. This pumping action of the two control relays A2 and B3 will continue as long as control and firing currents are supplied to the line circuit. Condenser C4 of Fig. 2 is normally charged by direct current flowing from cable ML1 through inductance 39, normally closed contact 88 of relay A3, resistance 89, normally closed contact 90 of relay B3, condenser C4 and to ground electrode 49. During the interval the two relays A3 and B3 are operated to close contacts 91 and 92, respectively, condenser C4 is connected to condenser C5 and discharges thereinto, condenser C4 being small as compared to condenser C5, the same as in Fig. 1. Consequently after several operations of the two control relays, a charge is built up on condenser C5 which is connected to tube V1 and detonator DD1 by circuits which are the same as in Fig. 1. When this charge on condenser C5 reaches a given value, tube V1 breaks down and condenser C5 discharges through the tube and the detonator element 60 to fire the mine.

To test the equipment of mine M1 of Fig. 2, the operator moves switches S1 and IS2 to supply control current to the line circuit and operate relay A3 to close contact 93 and open a normally closed contact 94, so that a condenser C7 is connected to the line circuit to be charged by the direct current, current flowing from conductor ML1 through inductance 39, resistance 71, contact 93 of relay A3, coil 72, condenser C7, resistance 95 and to ground electrode 96. The initial surge of current through coil 72 creates an electromotive force in unit DU that results in operation of relay D1 to bring about a reduction of the indication current and the resultant illumination of lamp 66. The parts are proportioned so that as the current dies down when condenser C7 becomes fully charged, the electromotive force created at unit DU is of the polarity and characteristic that bring about operation of relay D2, and with both relays D1 and D2 operated, relay AA2 is energized to open the selector circuit and the indication current is restored to its normal value to bring about the illumination of lamp 57.

In Fig. 3, the apparatus at the office and the mine equipment are the same as in Fig. 2 except for the circuit connection for the control portion of the mine equipment, and the apparatus of Fig. 3 will be readily understood from an inspection of Fig. 3 taken in connection with the description of the apparatus of Figs. 1 and 2. Normally, the amplifier AM of Fig. 3 is powered by direct current and 60 cycle alternating current supplied to the line circuit at the office. A vessel approaching mine M1 of Fig. 3 causes the operation of relay D1 in the same manner explained in the previous cases and operation of relay D1 connects in turn the selector circuit including filter MF1 to the line circuit to bring about a reduction in the indication current supplied by oscillator IS1 and the resultant illumination of lamp 66. With the vessel passing over the mine M1, the influence of unit DU brings about operation of relay D2 as previously explained. Operation of both relays D1 and D2 of Fig. 3 result in relay AA2 being connected to the line circuit and energized by direct current from battery 12. Energizing of relay AA2 to open contact 83—84 and close contact 82—85 disconnects condenser C3 from the line circuit and connects it to the reset windings of relays D1 and D2, and these relays are reset by the discharge from condenser C3 as previously explained. The resetting of relays D1 and D2 opens the selector circuit and also the circuit for relay AA2. The opening of the selector circuit causes the indication current to be restored to its normal value to bring about the illumination of lamp 57, and the deenergizing of relay AA2 permits this relay to be restored to its normal position.

To fire mine M1 of Fig. 3, the operator operates the switches S1 and IS1 to bring about the supply of both control current and firing current to the line circuit. Control current is passed by filter CF to energize control relay A3. Relay A3 is operated to open contact 94 and close contact 93. This operation of contacts 93 and 94 serves to connect condenser C7 and coil 72 across the line circuit to charge condenser C7 through coil 72. The initial surge of charging current influences coil 72 to bring about the operation of relay D1, and as the condenser C7 becomes fully charged, the dying away of the charging current influences unit DU to bring about the operation of relay D2. Relay AA2 is again energized and then restored to its normal position, and the closing of contact 97 of relay AA2 completes the connection for control relay B3 and, that relay is energized by the firing current flowing through filter BF. Relay B3 once operated completes a stick circuit including its own contact 98 to by-pass contact 97 of relay AA2. With relay AA2 restored to its normal position, and both relays A3 and B3 operated a connection is completed from cable ML1 through inductance 39, contact 100 of relay AA2, contact 101 of relay A3, contact 102 of relay B3, resistance 103 and condenser C5 to ground electrode 49, and a charge is gradually built up on condenser C5. Condenser C5 is connected to tube V1 and to the detonator DD1, the same as in Fig. 1 and when the charge on condenser C5 become sufficient to excite tube V1 to the breaking down point, the tube V1 becomes conductive and condenser C5 discharges through the detonator to fire the mine. The testing of the apparatus of Fig. 3 would be accomplished in substantially the same manner as explained in connection with the testing of the apparatus of Fig. 2.

Fig. 4 discloses a modification of the apparatus of Fig. 3 that we may use. In Fig. 4, condenser C5 of the mine equipment is normally charged by direct current from the line circuit through a relatively high resistance 104. Thus, when control relays A3 and B3 are operated in response to control and firing current, and the associated relay AA2 has been restored to its normal position, the condenser C5 discharges through the circuit connection including contacts 100, 101 and 102 of relays AA2, A3 and B3, respectively, and the detonator, and the detonator is fired in response to the discharge current.

Apparatus such as here disclosed has the advantages that all sources of current for indicating and firing the mines of a mine field are located in a shore office, a relatively high degree of selectivity is obtained in the indication of the approach of vessels to the individual mines of the mine field, and the probability of the firing of the mine due to shock excitation or foreign current is minimized.

Although we have herein shown and described several forms of selective control and indication systems embodying our invention, it is understood that various changes and modifications may be made therein within the scope of the appended claims without departing from the spirit and scope of our invention.

Having thus described our invention, what we claim is:

1. In combination, an office, an electric equipment connected to said office by a line circuit, an office indication oscillator of a preselected frequency connected to said line circuit to supply a line charging current of a given normal value, two indication relays at said equipment, means including a magnetic responsive unit connected to said relays to operate one relay in response to a first condition of a magnetic field and to operate the other relay in response to a second condition of a magnetic field, a selector circuit including a filter tuned to resonance at said preselected frequency and governed by said indication relays to be connected across said line circuit when either one of said relays is operated to vary the value of the current supplied by said indication oscillator to said line circuit, means controlled jointly by said relays when both relays are operated sequentially to disconnect said selector circuit to restore the current supplied by said oscillator to its normal value, and office indicating means coupled to said oscillator and governed by the indication current thus supplied by it to the line circuit.

2. In combination, an office, an electric equipment connected to said office by a line circuit, an office indication oscillator of a preselected frequency connected to said line circuit to supply a line charging current of a given normal value, two indication relays at said equipment, means including a control unit connected to said relays to effectively energize one relay in response to a first given condition and to effectively energize the other relay in response to a second given condition, a selector circuit including reactance connected to said line circuit through a contact of either one of said relays closed when the relay is effectively energized to reduce the value of the current supplied by said oscillator, means governed by said relays to disconnect said selector circuit from said line circuit when both relays are energized to restore the current supplied by said oscillator to its normal value, and office indicator means coupled to the connection of said oscillator to said line circuit and operated in one sense when said flow of indication current is reduced and in a second sense when the flow of the indication current is restored.

3. In combination, an office, an electric equipment connected to said office by a line circuit, an office indication oscillator of a preselected frequency, a filter, said oscillator connected to said line circuit through said filter, said filter tuned to create a resonant condition for said oscillator and line circuit with its distributed capacitance for the oscillator to supply a line charging current of a given normal value, two indication relays at said equipment, each of said relays having an operating winding and a reset winding and an armature movable between a given and an operated position, means including a magnetic field detector connected to the operating windings of said relays to selectively operate said relays in response to a first and a second given magnetic field condition at said equipment, a selector circuit including a filter tuned to resonance at said preselected frequency, said selector circuit connected across said line circuit through the operated position of the armature of either one of said relays to detune the line circuit and reduce the value of current normally supplied by said indication oscillator, means connected to said reset windings to at times reset the armatures of said relays to their given positions to disconnect said selector circuit and restore the current supplied by said indication oscillator to said normal value, and office indicator means coupled to the office filter and operated to a first or a second condition according as such flow of indication current is reduced or restored.

4. In combination, an office, an electric equipment connected to said office by a line circuit, an office indication oscillator of a preselected frequency connected to said line circuit to supply a line charging current of a given normal value and which current serves as an indication current, two indication relays at said equipment means including a magnetic field detector connected to said relays to selectively operate the relays in response to a first and a second given magnetic field condition at said equipment, a selector circuit including a filter tuned to resonance at said preselected frequency and connected across said line circuit through an operated position contact of either one of said indication relays to reduce the value of said indication current, two other relays at said equipment, circuit means including in series an operated position contact of each of said indication relays and contacts of said other relays to energize said other relays with a pumping action, a back contact of at least one of said other relays interposed in said selector circuit to alternately open and close the selector circuit to alternately reduce and restore the value of said indication current, and office indicator means coupled to the connection of said oscillator to said line circuit selectively governed by such control of the flow of said indication current.

5. In combination, an office, an electric equipment connected to said office by a line circuit, an office indication oscillator of a preselected frequency and an office source of direct current connected to said line circuit to supply a line charging current of a given normal value and which current serves as an indication current, two indication relays at said equipment, each of said relays having an operating and a reset winding and an armature operable to a first and a second position, means including a magnetic field detector connected to the operating windings of said relays to selectively operate the relays in response to a first and a second given magnetic field condition, a selector circuit including a filter tuned to resonance at said preselected frequency and connected across said line circuit through the second position of the armature of either of said relays to reduce the value of said indication current, another relay connected across said line circuit through the second position of the armatures in series of said indication relays to energize said other relay from said direct current source, a condenser connected to said line circuit through a deenergized position contact of said other relay to charge the condenser by direct current and said condenser connected to said reset windings through an energized position contact of said other relay to reset the indication relays by the discharge of the condenser and disconnect said selector circuit, and office indicator means coupled to the connection of said oscillator to the line circuit energized by the indication current thus supplied to the line circuit.

6. In combination, an office, an electric equipment connected to said office by a line circuit, an office indication oscillator of a preselected frequency connected to said line circuit to supply a line charging current of a given normal value and which current serves as an indication current, an electron tube amplifier at said equipment and including a first and a second coder contact member which are interposed in the input side and output side respectively of the amplifier, a magnetic field detector connected to the input side of the amplifier to supply a first and a second electromotive force in response to a first and a second magnetic field condition at said equipment, a first and a second polar indication relay connected to the output side of the amplifier to selectively operate the relays in response to said electromotive forces when thus coded and amplified, a selector circuit including a filter tuned to resonance at said preselected frequency and connected to said line circuit through an operated position contact of either one of said relays to reduce the value of said indication current, means including in series an operated position contact of each of said relays to disconnect said selector circuit to restore said indication current to its normal value, and office indicator means coupled to said oscillator operated by such indication current.

7. In combination, an office, an electric equipment connected to said office by a line circuit, an electron tube amplifier at said equipment and having a first and a second code operated contact member which are operated in step with each other and interposed in the input side and output side respectively of the amplifier, a magnetic field detector connected to the input side of the amplifier to supply electromotive forces varied according to given variations in a magnetic field at the equipment, a first and a second indication relay connected to the output side of the amplifier and selectively operated in response to the coding and amplifying of said electromotive forces, means including contacts of said indication relays and connected to said line circuit to cause an indication current to flow in the line circuit as predetermined by the operated condition of said relays, and office indicator means connected to the line circuit governed by such indication current.

8. In combination, an office, an electric equipment connected to said office by a line circuit, an office control oscillator and an office operating oscillator, said oscillators of different preselected frequencies, switching means to at times connect said oscillators to said line circuit, a first and a second relay at said equipment, said first relay connected to the line circuit through a connection disposed to pass current only of the frequency of the control oscillator, said second relay connected to the line circuit through a connection disposed to pass current only of the frequency of said operating oscillator, contacts of said relays interposed in such line circuit connections for each relay to control the other to effect a pumping action of the relays when both of said oscillators are connected to the line circuit, a relatively small condenser and a relatively large condenser, circuit means including contacts governed by said relays to alternately connect said small condenser to a source of direct current and to said large condenser to build up a charge on the large condenser in response to the pumping action of said relays, and an operating unit connected to said large condenser effectively energized when a predetermined charge is built up on the large condenser.

9. In combination, an office, an electric equipment connected to said office by a line circuit; an office direct current source, indication oscillator, control oscillator and operating oscillator; each of said oscillators of a preselected individual frequency, said direct current source and indication oscillator connected to said line circuit, switching means to at times connect said control and operating oscillators to the line circuit, a first and a second indication relay at said equipment, indicating means connected to said relays to selectively operate the relays in response to a first and a second given condition at the equipment, a selector circuit including a filter tuned to resonance at the frequency of said indication oscillator and connected across the line circuit through an operated contact of either one of said indication relays to control the current supplied by said indication oscillator, an office indicator coupled to the line circuit energized by such indication current, another relay at said equipment connected to the line circuit through a contact of each of said indication relays in series to energize that relay by said direct current source, a first and a second control relay at said equipment connected to said line circuit through a first and a second filter respectively, said first filter tuned to pass current only of the frequency of said control oscillator and said second filter tuned to pass current only of the frequency of said operating oscillator, a condenser and an operating unit of said equipment, and circuit means including contacts of said other relay and said control relays to connect said condenser at times to said line circuit to be charged by said direct current source and at times to said unit to operate the unit by the discharge of the condenser.

10. In combination, an office, a submarine mine connected to said office by a line circuit, an office indication oscillator of a preselected frequency and an office direct current source connected to said line circuit, an amplifier at said mine connected to said line circuit to be powered by said direct current source, two indication relays at said mine connected to said amplifier, a control unit responsive in a first and a second sense to the magnetic field created by a vessel approaching said mine and connected to said amplifier to control said relays according to the position of the vessel with respect to said mine, a selector circuit including a filter tuned to resonance at said preselected frequency and connected across said line circuit through a contact of either one of said relays to decrease the flow of indication current from said oscillator, means including in series a contact of each of said relays to disconnect said selector circuit to increase the flow of indication current, and office indicators coupled to the connection of said oscillator to said line circuit and selectively governed to a first and a second condition according as said flow of indication current is decreased or increased.

11. In combination, an office, a submarine mine connected to said office by a line circuit, an office indication oscillator of a preselected frequency and a source of direct current connected to said line circuit, an amplifier at said mine connected to said line circuit to be powered by said direct current source, two polar indication relays at said mine, each said relay having an operating and a reset winding, said operating windings connected to the output terminals of said amplifier, a magnetic field detector unit connected to the input terminals of the amplifier to govern the polarity of the current flowing in said operating windings according to a first and a second magnetic field condition created by a vessel approaching said mine to selectively operate the relays, a selector circuit including a filter tuned to resonance at said preselected frequency and connected across said line circuit through an operated position contact of either one of said relays to decrease the flow of indication current from said oscillator, means including in series an operated position contact of each of said relays to disconnect said selector circuit to increase the flow of such indication current, office indication means coupled to said oscillator and selectively responsive to such changes in the indication current, another office oscillator of a different preselected frequency disposed to be connected at times to said line circuit, another relay at said mine connected to the line circuit through a filter tuned to pass current only of said different preselected frequency, a condenser, and a circuit means including contacts of said other relay to connect at times said condenser to said line circuit to charge the condenser by said direct current source and to connect at times said condenser to said reset windings to reset said relays by the discharge of said condenser.

12. In combination, an office, a submarine mine connected to said office by a line circuit, an office indication oscillator of a preselected frequency and a source of direct current connected to said line circuit, an electron tube amplifier at said mine connected to the line circuit to be powered by said direct current source, two indication relays at said mine connected to said amplifier, a magnetic field detector unit connected to said amplifier to selectively energize said relays according to a first or a second magnetic field condition created by a vessel approaching the mine, a selector circuit including a filter tuned to resonance at said preselected frequency and connected across said line circuit through an energized position contact of either of said relays to reduce the flow of indication current from said oscillator, means including in series an energized position contact of each of said relays to disconnect said selector circuit to restore the flow of said indication current, office indicators coupled to said oscillator and selectively responsive to such changes in the flow of the indication current, another office oscillator having a different preselected frequency and connected at times to said line circuit, another relay at said mine connected to said line circuit through a filter tuned to pass current only of said different preselected frequency to energize said other relay, a coil disposed for magnetic relationship with said detector unit, a condenser; and circuit means including a contact of said other relay to connect said coil and condenser in series across said line circuit to charge the condenser from said direct current source through said coil to test the operative condition of said line circuit, amplifier, indication relays and indication means.

13. In combination, an office, a submarine mine connected to said office by a line circuit, an office direct current source connected to said circuit, an office control oscillator and an office firing oscillator, said control and firing oscillators of a first and a second preselected frequency respectively, office switching means to at times connect said oscillators to said line circuit, a first and a second relay at said mine, said first relay connected to said line circuit through a filter tuned to pass current only of said first frequency, said second relay connected to said line circuit through a filter tuned to pass current only of said second frequency, a back contact of said first relay interposed in the connection of said second relay and a front contact of said second relay interposed in the connection of said first relay to energize said relays by a pumping action when both of said oscillators are connected to the line circuit, a relatively small and a relatively large condenser, circuit means governed by said first and second relays to connect said small condenser alternately to said line circuit and to said large condenser to build up a charge on the large condenser due to the pumping action of said relays, a gas filled tube, a detonator, and said large condenser connected to said tube and detonator to break down said tube and discharge said large condenser through said detonator and tube to fire the mine.

WILLARD P. PLACE.
ALFRED B. MILLER.